(12) United States Patent
Shimizu et al.

(10) Patent No.: US 9,178,346 B2
(45) Date of Patent: Nov. 3, 2015

(54) ELECTRIC JUNCTION BOX, MOLDING AND PROCESSING DIES THEREFOR

(71) Applicant: Yazaki Corporation, Tokyo (JP)

(72) Inventors: Isanori Shimizu, Makinohara (JP); Shinobu Suzuki, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/344,483

(22) PCT Filed: Sep. 28, 2012

(86) PCT No.: PCT/JP2012/075865
§ 371 (c)(1),
(2) Date: Mar. 12, 2014

(87) PCT Pub. No.: WO2013/047900
PCT Pub. Date: Apr. 4, 2013

(65) Prior Publication Data
US 2014/0338966 A1    Nov. 20, 2014

(30) Foreign Application Priority Data
Sep. 29, 2011   (JP) ................................. 2011-214038

(51) Int. Cl.
*H01R 13/46*   (2006.01)
*H05K 5/00*    (2006.01)
(Continued)

(52) U.S. Cl.
CPC ................. *H02G 5/00* (2013.01); *H02G 1/145* (2013.01); *H02G 3/081* (2013.01); *H02G 3/083* (2013.01)

(58) Field of Classification Search
CPC ............ H02G 1/145; H02G 3/08; H02G 5/08
USPC .......... 174/520; 361/648, 649, 650, 652, 658; 439/76.1, 76.2
See application file for complete search history.

(56) References Cited

U.S. PATENT DOCUMENTS 5,605,465 A * 2/1997 Kobayashi et al. .......... 439/76.2
5,823,797 A * 10/1998 Sugiyama .................... 439/76.1
(Continued)

FOREIGN PATENT DOCUMENTS

DE     92 04 623 U1    6/1992
JP     2010-46835 A    3/2010

OTHER PUBLICATIONS

International Search Report (PCT/ISA/210), dated Jun. 27, 2013, issued by the International Searching Authority in counterpart International Patent Application No. PCT/JP2012/075865.
(Continued)

*Primary Examiner* — Chau N Nguyen
*Assistant Examiner* — Roshin Varghese
(74) *Attorney, Agent, or Firm* — Sughrue Mion, PLLC

(57) ABSTRACT

An electric junction box, comprises a plurality of bus-bars spaced apart from each other, and a case made of a resin, covering the plurality of bus-bars and including a window for exposing a portion of the plurality of bus-bars, wherein the window has a first edge located at respective exposed portions of the plurality of bus-bars and a second edge located between the respective exposed portions of the plurality of bus-bars; and the first edge is formed along a virtual line that is at an angle with respect to an extending direction of the bus-bars, and the second edge is formed with a depressed area having a shape of a rectangular triangle whose slope is the virtual line.

7 Claims, 5 Drawing Sheets

(51) Int. Cl.
    *H02B 1/20*     (2006.01)
    *H01R 12/00*     (2006.01)
    *H05K 1/00*     (2006.01)
    *H02G 5/00*     (2006.01)
    *H02G 3/08*     (2006.01)
    *H02G 1/14*     (2006.01)

(56) References Cited

U.S. PATENT DOCUMENTS

2010/0044066 A1     2/2010    Shimizu et al.
2010/0288532 A1*   11/2010   Ikeda et al. ............... 174/133 B

OTHER PUBLICATIONS

Written Opinion (PCT/ISA/237), dated Jun. 27, 2013, issued by the International Searching Authority in counterpart International Patent Application No. PCT/JP2012/075865.

Office Action dated Jan. 29, 2015, issued by the Korean Intellectual Property Office in counterpart Korean Application No. 10-2014-7008133.

Communication dated Aug. 5, 2015 issued by the Korean Intellectual Property Office in counterpart Korean Patent Application No. 10-2014-7008133.

* cited by examiner

ELECTRIC JUNCTION BOX, MOLDING AND PROCESSING DIES THEREFOR

TECHNICAL FIELD

The present invention relates to an electric junction box and molding and processing dies therefor and, more particularly, a technique for making a window for exposing bus-bars in a case of an electric junction box in which the plurality of bus-bars are covered with a resin case.

BACKGROUND ART

For instance, an electric junction box for connecting electrical components of a vehicle, such as an automobile, has been proposed in PTL 1. In the electric junction box, a plurality of bus-bars making up an electrical circuit, are insert-molded in a base member of a resin case. In order to facilitate positioning of the bus-bars during insert molding operation, the bus-bars are formed such that adjacent bus-bars are connected together at appropriate locations. After insert molding, a connection is cut so as to separate the bus-bars from each other. Desired electrical circuits are thereupon made in the base member of the case. According to PTL 1, a window for exposing the connections of the bus-bars to be separated is formed in the base member.

Moreover, in PTL 1, terminals for use in connection with another electrical component are provided in the electric junction box by standing upright the plurality of arranged bus-bars. And, a window for exposing the plurality of bus-bars is formed in a connection portion. The plurality of arranged bus-bars in the connection portion, are supported in a cantilever fashion along edge of the window.

CITATION LIST

Patent Literature

[PTL 1] JP-A-2010-46835

SUMMARY OF INVENTION

Technical Problem

Incidentally, positions of terminals of the plurality of arranged bus-bars must be set to positions of terminals of electrical components to be connected. For instance, the plurality of terminals of the electrical component to be connected, are placed with a displacement in order to prevent from interfering with each other. Accordingly, the terminals standing upright at respective extremities of the plurality of bus-bars are placed with a corresponding amount of displacement. In this case, a length (an extent) to which cantilever portions of the respective bus-bars are exposed along the edge of the window varies.

Incidentally, the length of an exposed portion of the respective bus-bar exhibits a function of absorbing vibrations. In a case that length of the exposed portion of the bus-bar is excessively large it works against a demand for a compact device. Accordingly, a conceivable way is to make lengths of the exposed portions of the respective bus-bars identical with each other, to align the edge of the window supporting the respective bus-bars in a cantilever fashion to positions of terminals of the respective bus-bars, and to thereafter form the edge of the window so as to extend at an angle with respect to a direction of extension of the bus-bars.

However, when the edge of the window supporting the respective bus-bars in a cantilever fashion is formed at an angle with respect to the extending direction of the bus-bars, a metal die for the window through which the respective bus-bars become exposed is made such that depressed areas which enclose respective bus-bars and raised portions which are located between the respective bus-bars are provided in a continuous manner. Thus, an end on one side of the raised portions located along a border between the depressed areas and the raised portions of the die assumes the shape of a sharp edge. Since the strength of the sharpened edge is deteriorated, there is possibility in that the edge is abraded by flow of a molten resin during molding operation.

The present invention has been implemented in view of the circumstances, and an object of the present invention is to prevent abrasion of an edge of a window, which would otherwise be caused by flow of a molten resin, in a die that forms the edge of the window supporting the respective bus-bars in a cantilever fashion so as to extend at an angle with respect to a extending direction of the bus-bars.

Solution to Problem

In order to solve the problem, the present invention provides with an electric junction box, comprising a plurality of bus-bars spaced apart from each other, and a case made of a resin, covering the plurality of bus-bars and including a window for exposing a portion of the plurality of bus-bars, wherein the window has a first edge located at respective exposed portions of the plurality of bus-bars and a second edge located between the respective exposed portions of the plurality of bus-bars, and the first edge is formed along a virtual line that is at an angle with respect to an extending direction of the bus-bars, and the second edge is formed with a depressed area having a shape of a rectangular triangle whose slope is the virtual line.

Specifically, each of acute edges of the die, which will be abraded by flow of a molten resin, is formed on one side of raised portions located along a border between the depressed areas enclosing each of the bus-bars of the die and the raised portions located between the bus-bars. Therefore, the depressed area having a shape of a rectangular triangle is formed between the bus-bars of a molded product, thereby making it possible to enlarge the raised portions outside the die; namely, a direction in which the window is broadened. Thereby, the acute edges are not formed on an edge face of the die that forms the window supporting the bus-bars in a cantilever fashion such that an edge of the window is extended at an angle with respect to the extending direction of the bus-bars. Accordingly, occurrence of abrasion, which would otherwise be caused by flow of a molten resin, can be prevented.

For instance, in a case that a die with acute edges is used when the case is formed from resin including glass fibers as a reinforcing material, the glass fibers will collide with the acute edges of the die during molding of the case, thereby abrading especially the acute edges of the die. The present invention in which the acute edges are not formed in the die is preferably applied to such a case.

In addition, since the acute edges of the die exhibit comparatively low mechanical strength, the edges may be damaged upon contacting the solidified resin or the bus-bars when the die is set or de-molded. For this reason, applying the embodiment in which the acute edges are not formed to the molding die is preferable.

When a connection for connecting the bus-bars is formed in the respective exposed portions of the plurality of bus-bars, the connection is disconnected after molding so as to form an electrical circuit.

Also, the present invention provides with a molding die comprising at least an upper die and a lower die for integrally molding a plurality of bus-bars which are to form an electrical circuit, to a base member of a case made of a resin, wherein a frame portion forming a window for exposing portions of the plurality of bus-bars spaced apart from each other in the base member is formed on at least one of the upper and lower dies, an edge of the frame portion corresponding to an edge of the window includes a first edge located at a depressed area enclosing the respective bus-bars and a second edge located at a raised portion located between the respective bus-bars, the first edge is formed along a virtual line that is at an angle with respect to an extending direction of the bus-bars, and the second edge is formed on a lateral surface of the frame portion in a shape of a rectangular triangle that takes the virtual line as a slope and that is raised on the lateral surface of the frame portion. According to this construction, raised portions on one side of the frame portion of the die where the acute edges are formed can be broadened toward a lateral surface, so that abrasion of the edges, which would otherwise be caused by flow of a molten resin, can be prevented.

Further, a processing die of the present invention for cutting the connections of the bus-bars of the electric junction box brings the exposed portions of the plurality of bus-bars into contact with a dice in which a punch insert hole is formed at a position of the connection, thereby inserting the punch toward a dice insert hole and cutting the connections. In the processing die, the dice is formed along the first and second edges of the electric junction box.

Advantageous Effects of Invention

According to the present invention, it is possible to prevent abrasion of edges of a window, which would otherwise be caused by flow of a molten resin, in a die that forms a window by letting edges of the window supporting the bus-bars in a cantilever fashion extend at an angle with respect to an extending direction of the bus-bars.

DESCRIPTION OF EMBODIMENTS

Figure 1:
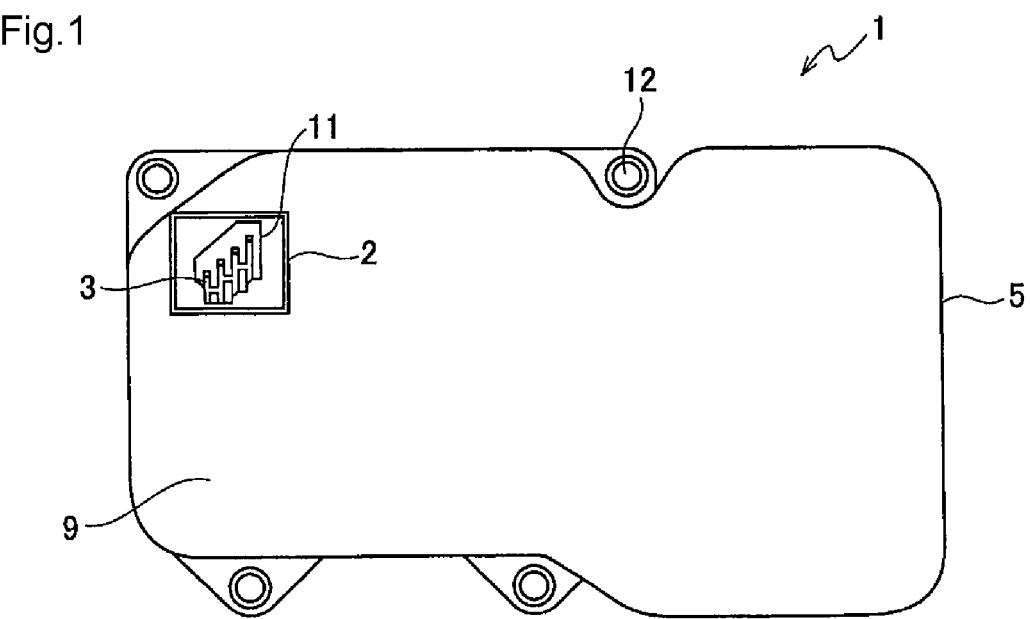
FIG. 1 is a plan view of an electric junction box of an embodiment of the present invention.
Figure 2:
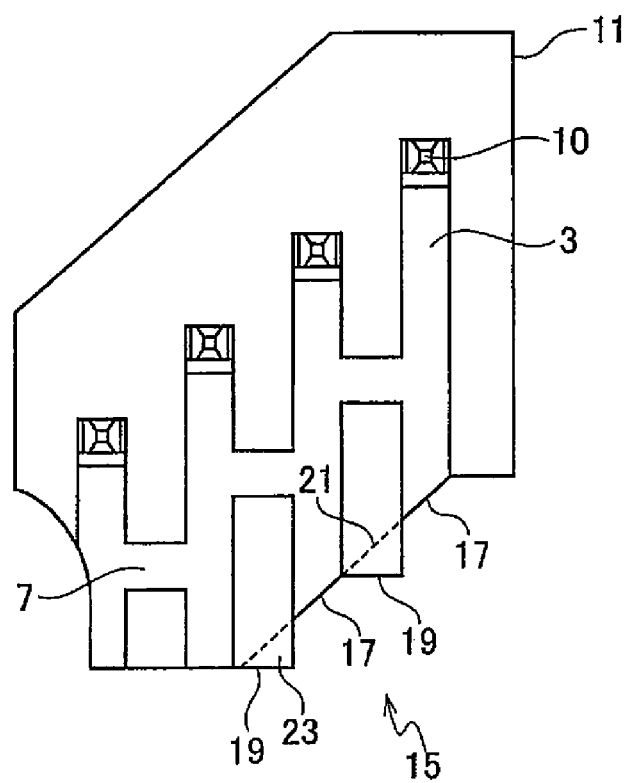
FIG. 2 is an enlarged view of an area enclosed by square 2 in FIG. 1.

An embodiment of the invention is described hereunder. As shown in FIGS. 1 and 2, an electric junction box 1 of an embodiment is one that interconnects electrical parts of; for instance, an ABS (Antilock Braking System) of an automobile. The electric junction box 1 has a plurality of bus-bars 3 spaced apart from each other and a case 5 that is made of a resin and which covers the plurality of bus-bars 3. The plurality of bus-bars 3 are formed from a conductive metallic plate. Terminals 10 standing up from the respective bus-bars 3 are formed at tip bars of the respective bus-bars 3. The terminals 10 are formed so as to be connected with terminals of respective electrical parts to be connected. The plurality of bus-bars 3 are connected together by metallic connections 7. The connections 7 are formed at a position where the bus-bars are exposed through a window 11 of the case 5 to be described later. The plurality of bus-bars 3 are insert-molded into a base member 9 of the case 5 made of a resin so as to make an electrical circuit within the base member 9.

The case 5 is formed from; for instance, a glass fiber resin. The window 11 for exposing portions of the plurality of bus-bars 3 is formed in the case 5. The window 11 has an edge 15 for supporting the respective bus-bars 3 in a cantilever fashion. The window 11 is formed at a position where the connections 7 and the terminals 10 of the respective bus-bars 3 are exposed. A plurality of through holes 12 are formed on or along sides of the case 5 so that bolts can be inserted into the respective through holes 12 and the electric junction box 1 can be fastened to a predetermined position.

A characteristic configuration of the electric junction box 1 is now described. First edges 17 located at a position where the plurality of bus-bars 3 are to be exposed and second edges 19 located between the plurality of bus-bars 3 at their exposed portions are formed continuously along the edge 15 of the window 11 of the case 5 through which the plurality of bus-bars 13 project. The edges 17 are formed along a virtual line 21 that is at an angle with respect to an extending direction of the bus-bars 3. The edge 15 of the window 11 that supports the respective bus-bars 3 in a cantilever fashion is formed in alignment with positions of the terminals 10 of the respective bus-bars 3. As a result, lengths (lengths from the edge 15 to the respective terminals 10) of exposed portions of the respective bus-bars 3 can be set to the same length. Each of the edges 19 has a depressed area 23 whose cross sectional profile is a rectangular triangle having the virtual line 21 as an oblique line. The window 11 is enlarged in a direction in which the window 11 is broadened by the edge 15 by an amount corresponding to the depressed areas 23.

Characteristic function of the electric junction box 1 is now described along with a molding die and a processing die. The molding die used for molding the electric junction box 1 includes an un-illustrated upper die and an un-illustrated lower die. The plurality of bus-bars 3 are supported in a cavity engraved in the die. A molten resin is poured into the cavity so as to insert-mold the plurality of bus-bars 3.

Figure 3:
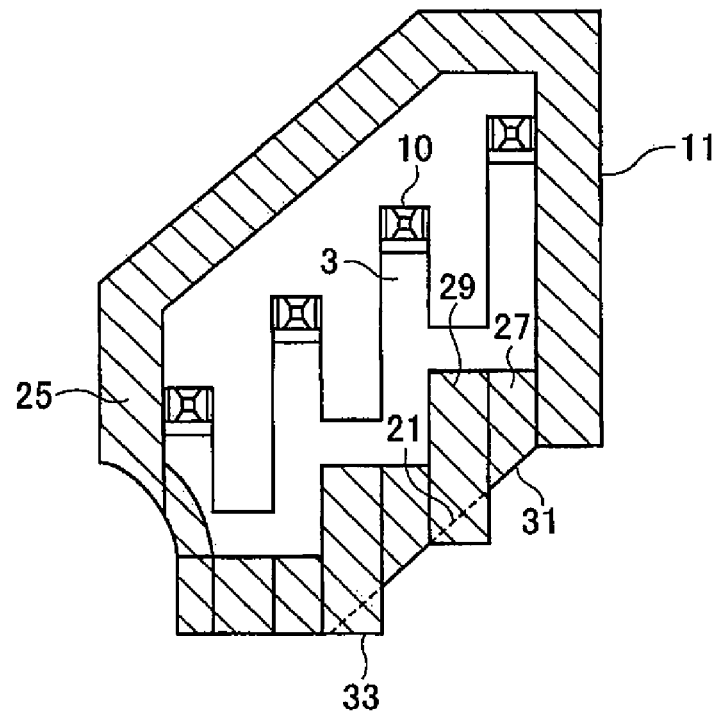
FIG. 3 is a conceptual rendering showing a die used for molding a window shown in FIG. 1.
Figure 4:
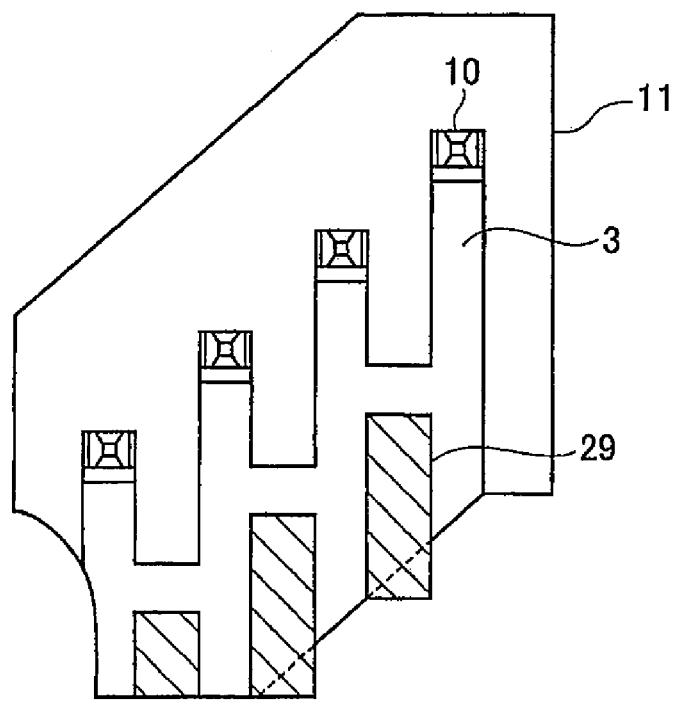
FIG. 4 is a conceptual rendering showing an insert die of the die shown in FIG. 3.

As shown in FIG. 3, a frame portion 25 used for forming the window 11 in the base member 9 is formed in at least the upper die or the lower die of the molding die. The frame portion 25 is formed into a cylindrical shape that encloses the exposed portions of the plurality of bus-bars 3. The frame portion 25 includes depressed areas 27 which each enclose the plurality of bus-bars 3 and raised portions 29 located between the bus-bars 3. The depressed areas 27 and the raised portions 29 are formed at the position of the frame portion 25 corresponding to the edge 15 of the window 11. The raised portions 29 are made in the form of insert dies sandwiched between the bus-bars 3.

An edge of the frame portion 25 corresponding to the edge of the window 11 is made up of edges 31 located at positions corresponding to the depressed areas 27 and edges 33 located at positions corresponding to the raised portions 29. The edges 31 are formed along the virtual line 21 that is at an angle with respect to an extending direction of the bus-bars 3. Each of the edges 33 is formed so as to assume a cross sectional profile of a rectangular triangle that has the virtual line 21 as an oblique line and that is pointed outside an lateral surface of the frame portion 25.

Specifically, in the electric junction box 1 of the present embodiment, the depressed areas 23 each of which assumes the shape of a rectangular triangle are formed along the edges 19 of the window 11 of the case 5. The corresponding raised portions 29 of the frame portion 25 are enlarged outside the frame portion 25 along the respective depressed areas 23. Thereby, the raised portions 29 each assumes a rectangular cross sectional profile, and an acute edge, which would otherwise be abraded by flow of a molten resin, is not formed.

Figure 5:
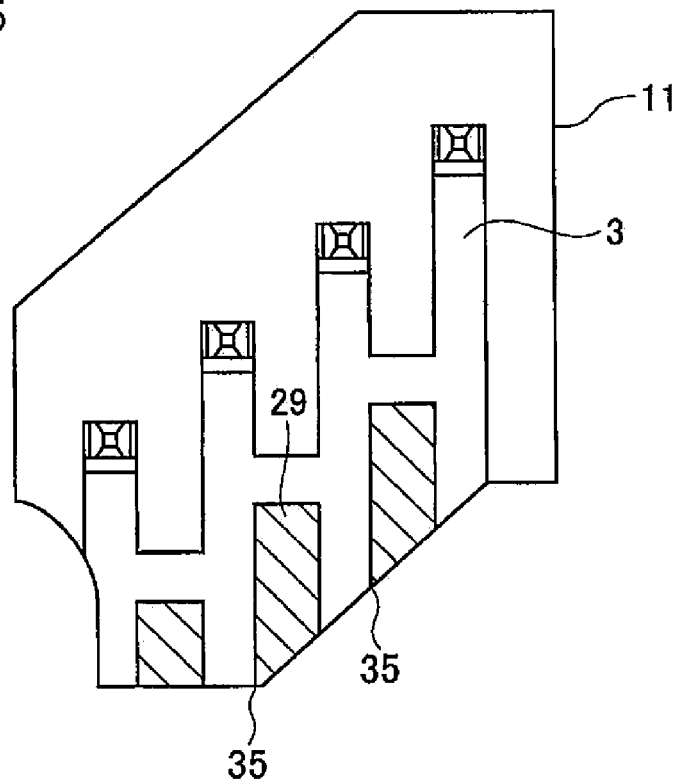
FIG. 5 is a conceptual rendering in which a projecting side of the window is formed at an angle with respect to an extending direction of bus-bars in contradiction to the embodiment.

In the meantime, when the depressed areas 23 are not formed between the bus-bars 3 along the edge 15 of the window 11 as shown in FIG. 5, each of acute edges 35 is formed on one side of each of the raised portions 29 (a left side of the raised portion 29 in the drawing) along the border between the depressed area 27 enclosing each of the bus-bars 3 of the frame portion 25 and the raised portion 29 interposed between the bus-bars 3. The edges 35 are abraded by flow of a molten resin and glass fibers during insert molding operation, which shortens the life of the molding die.

Figure 6A:
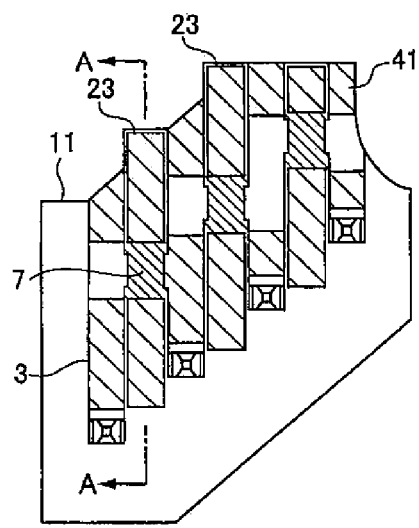
FIG. 6 (*a*) is a drawing showing a dice and a punch for cutting a connection of the bus-bars of the embodiment, FIG. 6(*b*) is a cross sectional view taken along a line A-A as shown in FIG. 6(*a*)
Figure 6B:
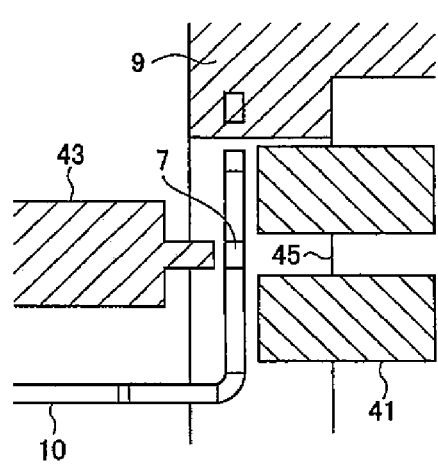
Figure 7:
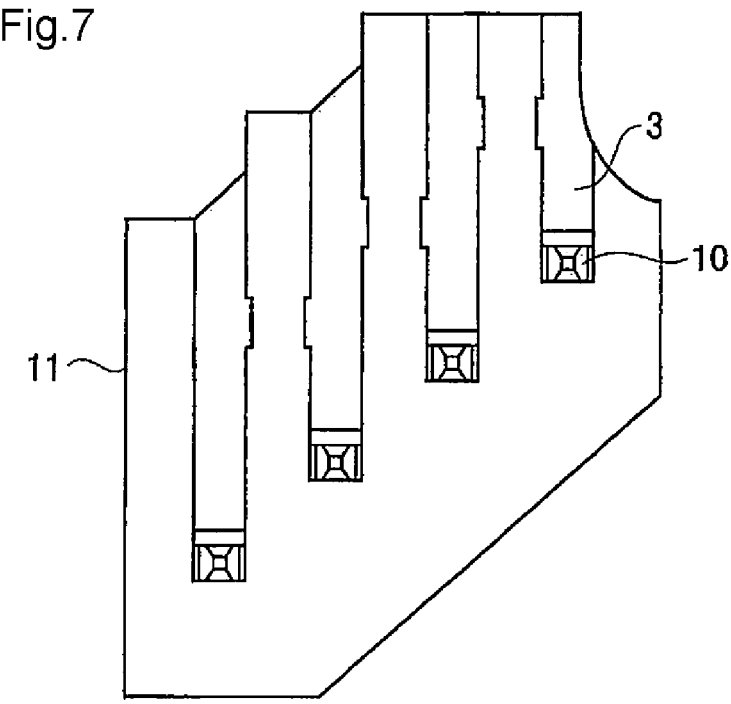
FIG. 7 is a drawing showing a state in which all of the connections of the bus-bars are cut.

After molding of the electric junction box 1, the connections 7 of the bus-bars 3 are cut. As shown in FIGS. 6(a) and 6(b), the connections 7 are cut with a processing die equipped with a dice 41 and a punch 43. The dice 41 has an insert hole 45 that comes into contact with the exposed portions of the plurality of bus-bars 3 and that permits insertion of the punch 43 at the position of the connection 7, and is formed along the edges 17 and 19. The thus-configured dice 41 is placed and brought into contact with a back surface of each of the bus-bars 3 as shown in FIGS. 6(a) and 6(b). The punch 43 is lowered to the connection 7 from above, thereby cutting the same. As shown in FIG. 7, all of the connections 7 are thereby cut, and a desired electric circuit is formed.

In the electric junction box 1 of the embodiment, the depressed area 23 having the shape of a rectangular triangle is formed along each of the edges 19 of the window 11 of the case 5. Hence, the dice 41 can be broadened by an amount corresponding to the depressed area 23, and hence strength of the dice 41 can be increased.

Figure 8:
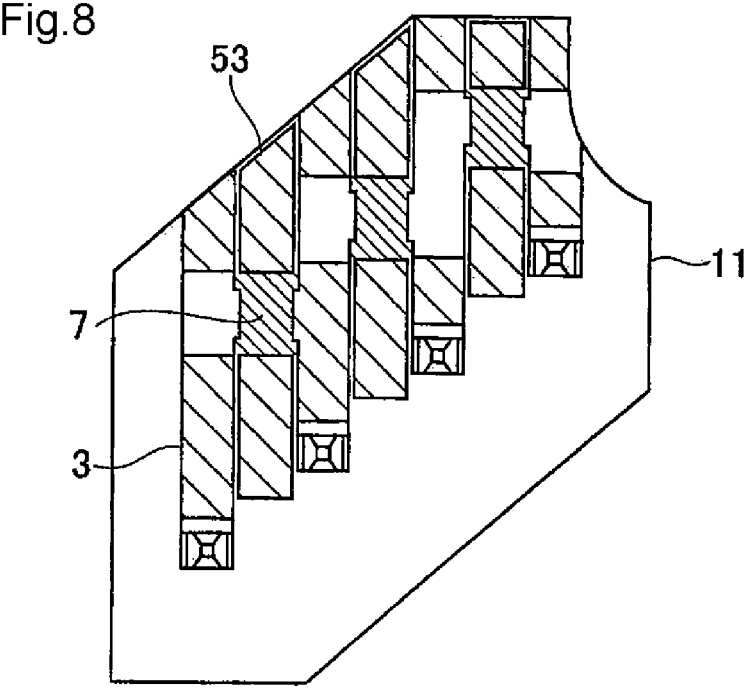
FIG. 8 is a drawing showing the dice used when the projecting side of the window is formed at an angle with respect to the extending direction of the bus-bars in contradiction to the embodiment.

On the other hand, when the depressed areas 23 are not formed along the edge 15 of the window 11 as shown in FIG. 8, there is possibility in that the strength of the dice 41 becoming smaller than that achieved in the present embodiment. With a view toward making explanations easy to understand, FIGS. 6 and 8 show the dice 41 hidden behind the bus-bar 3.

In the electric junction box 1 of the present embodiment, the depressed area 23 having the form of a rectangular triangle is formed between the bus-bars 3, thereby enabling extension of each of the raised portions 29 outside the frame portion 25. Since an acute edge is not formed in each of the raised portions 29, abrasion of the raised portions, which would otherwise be caused by flow of a molten resin, can be prevented.

In particular, if the die with the acute edges 35 is used when the case 5 is formed from resin including glass fibers as a reinforcing material, glass fibers will collide with the edges 35 during molding of the case 5, thereupon abrading especially the edges 35. The embodiment in which the acute edges 35 are not formed in the die is preferably applied to such a case.

Since the acute edges 35 make mechanical strength of the die comparatively low, the edges 35 may be damaged upon contacting the solidified case 5 or the bus-bars 3 when the die is set or de-molded. Consequently, infliction of damage to the die can be prevented by adopting the embodiment in which the acute edges 35 are not formed.

Although the embodiment has been described as an example in which the plurality of bus-bars 3 are connected together by the connections 7, the connections 7 can be omitted.

Figure 9:
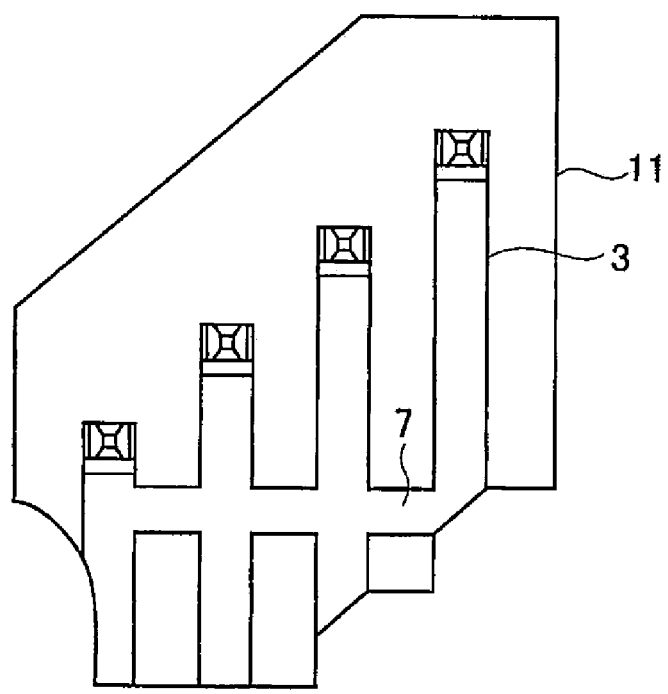
FIG. 9 is a drawing showing an example modification in which positions of the connections of the bus-bars are changed.

Further, as shown in FIG. 9, the connections 7 can be formed at the same positions in the extending direction of the plurality of bus-bars 3. Positional deviations of the connections 7 due to manufacturing tolerance, or the like, can thereby be prevented, and the connections 7 can be prevented from deviating from the processing die.

The present application is based on Japanese Patent Application No. 2011-214038 filed on Sep. 29, 2011, the contents of which are incorporated herein by reference.

INDUSTRIAL APPLICABILITY

According to the present invention, it is possible to prevent abrasion of edges of a window, which would otherwise be caused by flow of a molten resin, in a die that forms a window by letting edges of the window supporting the bus-bars in a cantilever fashion extend at an angle with respect to an extending direction of the bus-bars.

REFERENCE SIGNS LIST

1 ELECTRIC JUNCTION BOX
3 BUS-BAR
5 CASE
7 CONNECTION
9 BASE MEMBER
11 WINDOW
17 EDGE
19 EDGE
21 VIRTUAL LINE
23 DEPRESSED AREA
25 FRAME PORTION
27 DEPRESSED AREA
29 RAISED PORTION
31 EDGE
33 EDGE
41 DICE
43 PUNCH
45 INSERT HOLE

The invention claimed is:
1. An electric junction box, comprising:
a plurality of bus-bars spaced apart from each other; and
a case made of a resin, covering the plurality of bus-bars and including a window for exposing a portion of the plurality of bus-bars;
wherein the window has a first edge, and the respective exposed portions of the plurality of bus-bars extend coplanar with the window and to the first edge, and a second edge located between the respective exposed portions of the plurality of bus-bars; and the first edge is along a virtual line that is at an angle with respect to an extending direction of the bus-bars, and the second edge is with a depressed area having a shape of a triangle whose slope is the virtual line.

2. The electric junction box according to claim 1, wherein a connection for connecting the bus-bars is in the respective exposed portions of the plurality of bus-bars, and the connection is disconnected after molding.

3. A processing die, comprising:
a dice and a punch cutting the connection of the electric junction box according to claim 2,
wherein the dice has an insert hole configured to come into contact with the exposed portions of the plurality of bus-bars and to permit insertion of the punch at a position of the connection; and
the dice is along the first and second edges.

4. A molding die comprising:
at least an upper die and a lower die configured to integrally mold the plurality of bus-bars which are configured to form an electrical circuit, to a base member of the case made of the resin of the electric junction box according to claim 1;
wherein a frame portion forming the window for exposing portions of the plurality of bus-bars spaced apart from each other in the base member is on the at least one of the upper and lower dies;
an edge of the frame portion corresponding to an edge of the window includes a first edge located at a depressed area enclosing the respective bus-bars and a second edge located at a raised portion located between the respective bus-bars;
the first edge is along a virtual line that is at an angle with respect to an extending direction of the bus-bars; and
the second edge is on a lateral surface of the frame portion in a shape of a triangle that takes the virtual line as a slope and that is raised on the lateral surface of the frame portion.

5. The electric junction box according to claim 1, wherein the triangle is divided from a rectangular area between at least two of the plurality of bus-bars,
the triangle is divided from the rectangle by the virtual line, which is an oblique line of the rectangle, along the angle,
the rectangular area without the triangle is within the window, and
the triangle is outside of the window.

6. The electric junction box according to claim 1, wherein a direction in which the first edge extends is along the virtual line.

7. The electric junction box according to claim 1, each of the plurality of bus-bars within the window is spaced apart, along the slope, from each other of the plurality of bus-bars, and
each of the plurality of bus-bars has a same longitudinal length.

* * * * *